Feb. 18, 1947. W. F. MEYERS 2,416,193
SCAVENGE PUMP DRIVE
Filed Feb. 26, 1945 3 Sheets-Sheet 1
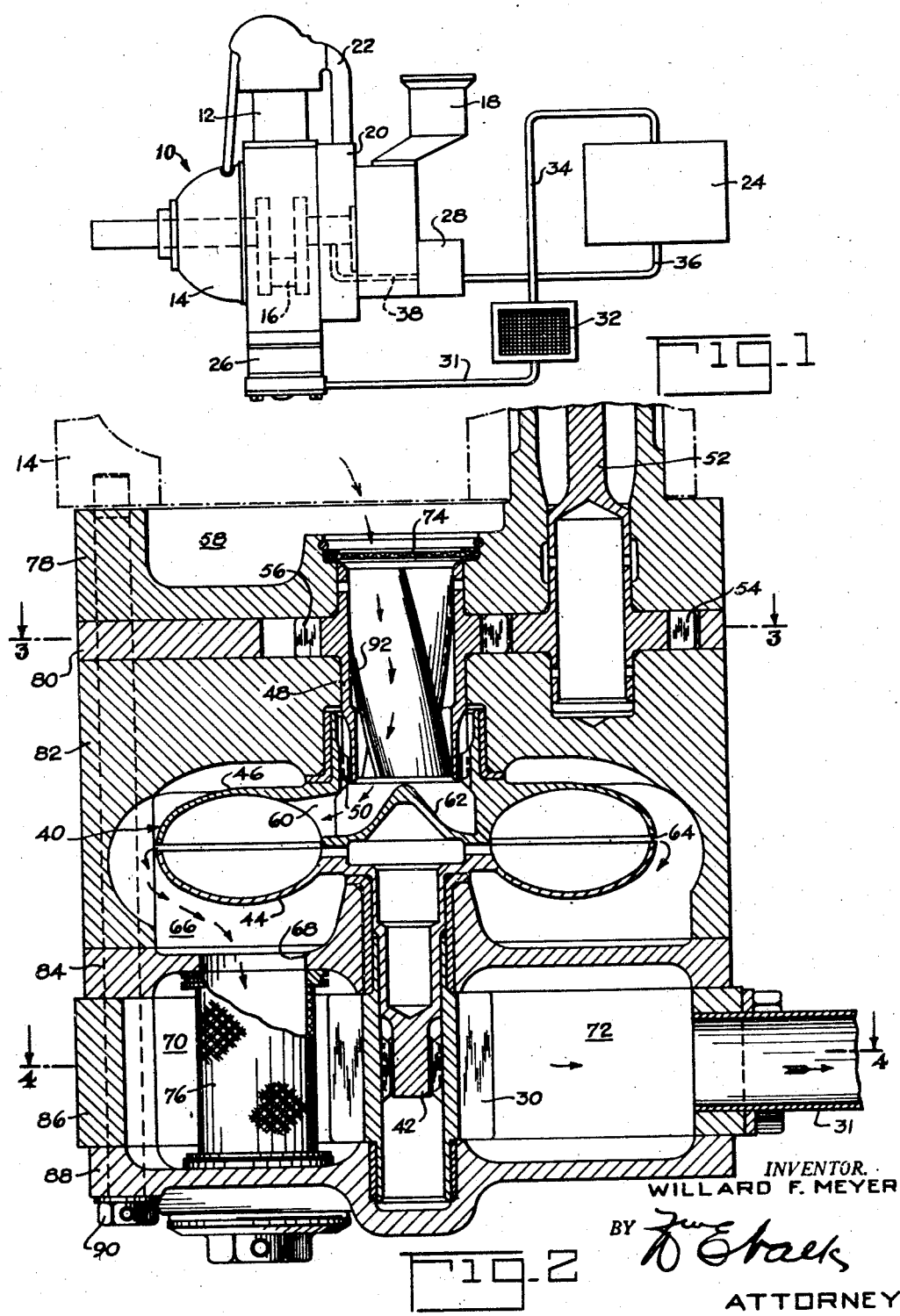
INVENTOR.
WILLARD F. MEYERS.
BY
ATTORNEY Feb. 18, 1947. W. F. MEYERS 2,416,193
SCAVENGE PUMP DRIVE
Filed Feb. 26, 1945 3 Sheets-Sheet 2

INVENTOR.
WILLARD F. MEYERS
BY
ATTORNEY

Feb. 18, 1947. W. F. MEYERS 2,416,193
SCAVENGE PUMP DRIVE
Filed Feb. 26, 1945 3 Sheets-Sheet 3

*INVENTOR.*
WILLARD F. MEYERS.
BY
ATTORNEY

Patented Feb. 18, 1947

2,416,193

UNITED STATES PATENT OFFICE 2,416,193

SCAVENGE PUMP DRIVE

Willard F. Meyers, Demarest, N. J., assignor to Wright Aeronautical Corporation, a corporation of New York Application February 26, 1945, Serial No. 579,844

13 Claims. (Cl. 103—5)

This invention relates to engine lubrication systems and is particularly directed to means for returning oil from an engine oil sump to a supply reservoir therefor.

The lubrication systems of modern aircraft engines generally comprise a so-called dry-sump system in which an engine-driven oil pump draws lubricating oil from a supply reservoir and pumps it under pressure to the engine parts to be lubricated and from which parts the oil drains into a sump. In addition, a scavenge pump operates to return the oil from the sump through an oil cooler back into the supply reservoir. In order to insure removal of substantially all the oil from the sump to the reservoir under all engine-operating conditions, the scavenge pump is provided with a capacity more than sufficient for returning all the oil from the sump to the reservoir under the most adverse pump-operating conditions. Thus, the efficiency of the conventional gear-type scavenge pump provided on aircraft engines decreases with decreasing pump inlet pressure and therefore the scavenge pump is provided with a capacity sufficient to handle the oil flow at high altitudes. As a result, at low altitude operation, the scavenge pump capacity is considerably in excess of the lubricating oil flow and therefore this pump returns a large quantity of air and other gases as well as oil back into the oil reservoir. The air and other gases thus returned through the oil reservoir by the scavenge pump become entrained within the oil and are only partially separated therefrom within the oil reservoir. This entrainment of gases within the engine-lubricating oil considerably reduces the quantity of oil supplied by the engine-driven lubricating oil pump. In addition, the presence of gases within the oil being pumped back through the oil cooler to the oil reservoir considerably reduces the efficiency of the cooler.

It is an object of this invention to provide a variable drive connection between the engine and its scavenge pump such that the pump only operates when there is oil for it to pump, and such that the speed of the pump operation depends on the quantity of oil available to be pumped to the end, that the pump remains submerged in oil. Specifically, the invention comprises a hydraulic coupling in the drive connection between the engine and the scavenge pump such that, when there is little or no oil in the engine sump, the coupling runs empty thereby uncoupling the scavenge pump from the engine and when there is only a small quantity of oil in the sump, the hydraulic coupling runs with a high degree of slip thereby providing only a low speed drive for the scavenge pump. It is a further object of this invention to use the coupling as a centrifugal pump for boosting the inlet oil pressure to the scavenge pump.

During engine operation, a large quantity of oil is thrown about the interior of the engine crankcase by the moving parts of the engine and therefore considerable air and other gases become entrained within the oil as it settles into the sump. It is a further object of this invention for using the hydraulic coupling as a centrifuge for separating at least some of the air and other gases thus entrained within the oil.

Other objects of this invention will become apparent upon reading the annexed detailed description in connection with the drawings in which:

Figure 1 is a schematic view of a conventional radial cylinder aircraft engine and the lubrication system therefore embodying the invention;

Figure 2 is a sectional view along line 2—2 of Figure 4 illustrating one form of hydraulic coupling drive for the scavenge pump;

Figure 3:
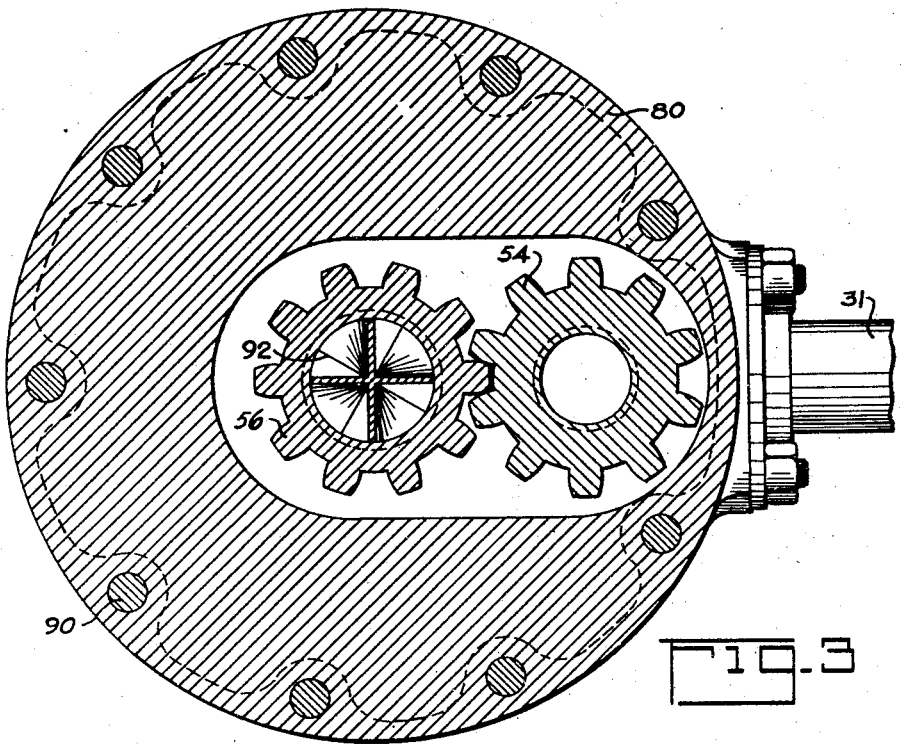
Figure 4:
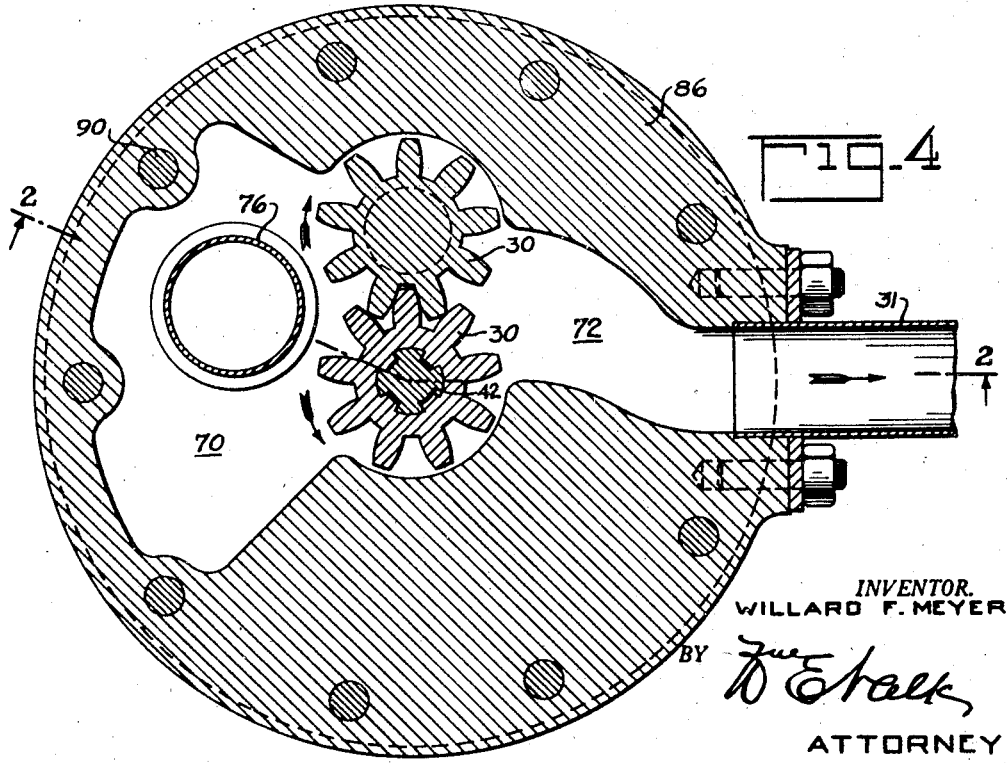
Figure 5:
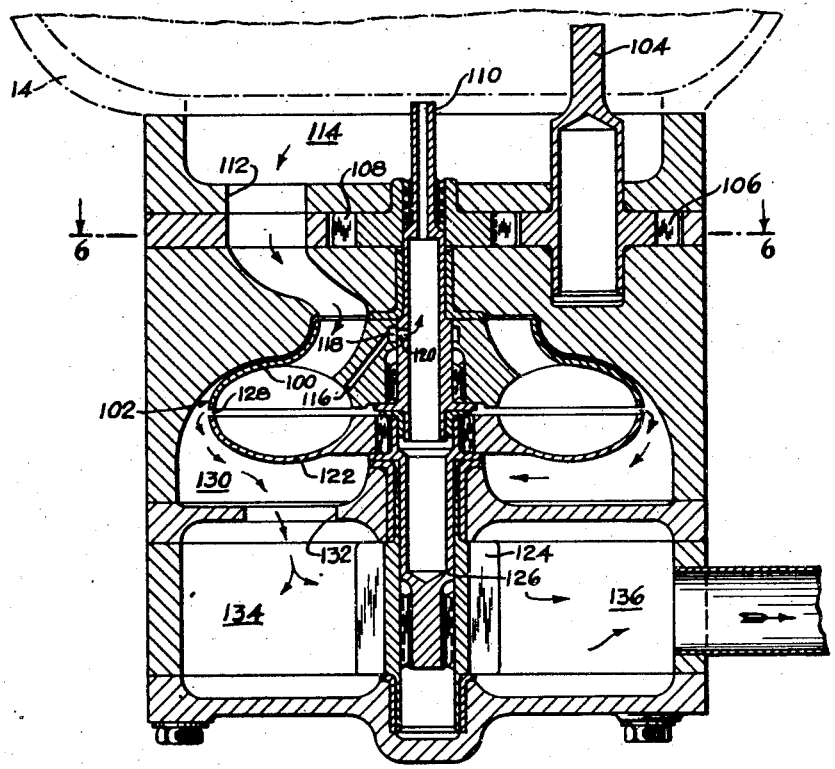

Figures 3 and 4 are sectional views taken along lines 3—3 and 4—4 respectively of Figure 2;

Figure 5 is a view similar to Figure 2 of a modified form of the invention; and

Figure 6:
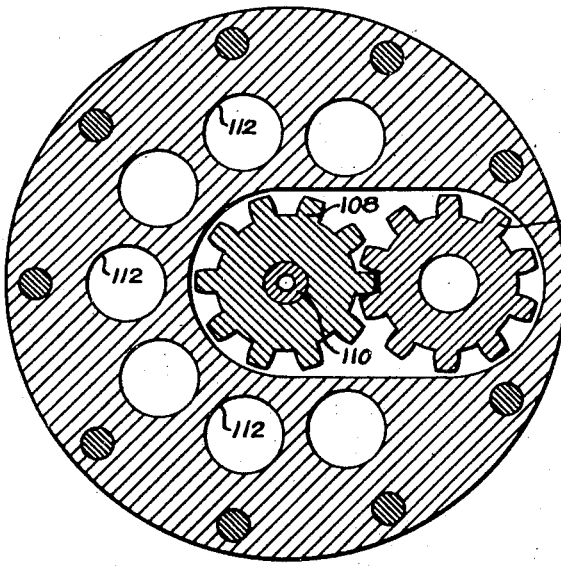

Figure 6 is a sectional view taken along lines 6—6 of Figure 5.

Referring first to Figure 1, a conventional radial cylinder internal combustion engine illustrated at 10 is provided with a bank of radially-disposed cylinders 12 mounted about the engine crankcase 14 and within which the crankshaft 16 is disposed. The engine is also provided with a carburetor 18 from which the combustion air or mixture is fed to an annular intake manifold 20 and thence to the individual engine cylinders 12 through intake pipes 22.

The lubrication system of the engine comprises an oil supply tank or reservoir 24, a sump 26 secured to the crankcase between a pair of adjacent pump cylinders of the engine, an engine driven oil pump 28 secured to the rear section of the engine crankcase and an engine-driven gear-type scavenge pump 30 (see Figures 2 to 4) disposed within the sump. The scavenge pump 30 is arranged to return oil from the engine sump through conduit 31, oil cooler 32, and conduit 34 back into the oil reservoir 24. A conduit 36 connects the inlet side of the pump 28 to the bottom of the oil reservoir and this pump delivers oil under pressure to the various bearing surfaces of the engine through passages such as 38.

In order to insure substantially-complete removal of all the oil from the engine sump under all operating conditions, the scavenge pump 30 is provided with a capacity sufficient to handle all the oil flow under the most adverse engine-operating conditions—for example, at high altitudes since the efficiency of a gear-type pump decreases with decreasing pump inlet pressure. Accordingly, at lower altitudes and, if the scavenge pump were geared directly to the engine as is the conventional practice, only a portion of the capacity of the pump would be used to return oil back into the oil reservoir.

With the present invention the oil scavenge pump is driven from the engine through a hydraulic coupling 40. As illustrated in Figures 2 to 4, the scavenge pump 30 is disposed in the bottom of the sump 26 and is drivably splined to a shaft 42 which, in turn, is drivably connected to the driven element 44 of the hydraulic coupling. The driving element 46 of the hydraulic coupling is driven from the shaft 48 through the splines 50 and the shaft 48 is drivably connected to an engine-driven shaft 52 through gears 54 and 56. Shaft 48 is hollow and extends into and above the bottom of the sump chamber 58. The driving coupling element 46 is provided with one or more substantially radial openings 60 and with a conical hub 62 having an upwardly-extending apex on the axis of the hollow shaft 48. The arrangement is such that oil from the sump chamber 58 runs down the hollow shaft 48 and the conical hub 62 serves to deflect the oil radially outwardly through openings 60 into the annular coupling space defined by the coupling elements 44 and 46.

The coupling elements 44 and 46 have a peripheral clearance as indicated at 64 through which the coupling oil is thrown outwardly into the annular space 66 by the centrifugal force acting on the oil within the hydraulic coupling. From the annular space 66, the oil descends through opening 68 to the scavenge pump inlet chamber 70 from which it is picked up by the scavenge pump 30 which discharges the oil into the pump outlet chamber 72 and the oil return line 31 back into the oil reservoir 24. If desired, an oil strainer 74 may be disposed across the supply end of the hollow shaft 48 and a cylindrical oil strainer 76 may be disposed within the pump inlet chamber 70 in alinement with the opening 68. For assembly purposes, the sump housing for the hydraulic coupling and scavenge pump is built up from sections 78, 80, 82, 84, 86 and 88 secured together and to the engine crankcase by bolts 90.

In order to help turn the oil, flowing downwardly through the shaft 48, radially outwardly through opening 60 into the hydraulic coupling, the hollow shaft 48 is provided with internal vanes 92 to force the oil within the shaft 48 to rotate therewith whereby the centrifugal force acting on the oil throws the oil radially outwardly through the opening 60 into the hydraulic coupling. The vanes 92 are also provided with a helical twist to help force or pump the oil down the shaft 48.

With this construction, the engine-driven shaft 52 drives the scavenge pump 30 through the hydraulic coupling 40. When the coupling 40 is full of oil, it operates with very little slip to provide a substantially-direct drive from the shaft 48 to the scavenge pump 30. If the quantity of oil entering the coupling 40 should drop below the output capacity of pump 30, the coupling will begin to empty and its slip will increase thereby decreasing the speed and output of the scavenge pump. If there is no oil in the sump, the coupling will empty and there will be no engine drive to the scavenge pump. In this way the scavenge pump is only driven at a speed sufficient to remove the oil entering the coupling. Therefore, the scavenge pump, when operating, will remain submerged in oil and will not add air or other gases to the oil it pumps back into the oil reservoir.

With the aforedescribed construction, the oil within the hydraulic coupling is thrown out through the clearance 64 by the centrifugal force acting on the oil. Accordingly, the hydraulic coupling not only provides a drive for the scavenge pump but it also acts as a centrifugal pump boosting the oil inlet pressure to the scavenge pump. This feature is quite desirable since, as previously noted, the capacity of a conventional gear pump decreases with decreasing pump inlet pressure. Accordingly, by thus substantially boosting the scavenge pump inlet pressure, the limiting altitude at which the pump still has sufficient capacity is substantially raised. Obviously this feature is quite important for aircraft engines designed for high altitude operation.

During engine operation, a considerable quantity of oil is thrown around inside the engine crankcase by the moving parts of the engine and therefore a substantial quantity of air becomes entrained within the oil before it even drains into the sump. However, with the present invention, the hydraulic coupling and shaft vanes 92 act as a centrifuge for separating and removing from the oil at least a portion of this entrained air before it reaches the scavenge pump. Thus, as oil and entrained air descend down the shaft 48, the vanes 92 cause this mixture to rotate with the shaft 48 and therefore the oil is thrown radially outwardly against the walls of the shaft 48 by the centrifugal force acting thereon, thereby separating at least some of the air from the oil and leaving the air free to escape up through the center of the shaft 48 back into the crankcase. In addition, the hydraulic coupling 40 also acts as a centrifuge such that the air accumulates about the hub of the coupling from which it can escape up through the center of the shaft 48 since, as described, the oil descends down the hollow shaft 48 adjacent the walls thereof.

A modified form of the present invention is illustrated in Figures 5 and 6 and, as in Figures 2 to 4, a driving coupling element 100 of a hydraulic coupling 102 is driven from an engine driven shaft 104 through gears 106 and 108 and a hollow shaft 110. However, in this embodiment of the invention, separate passages 112 are provided through which the oil drains from the sump chamber 114 down into the hydraulic coupling 102. In addition, a passage 116, annular groove 118 and a radial passage 120 in the hollow shaft 110 connect the interior hub portion of the hydraulic coupling 102 with the interior of the hollow shaft 110. With this construction and as a result of the centrifuge action of the hydraulic coupling, the air separated from the oil within the coupling is free to escape back into the engine crankcase through the hollow shaft 110. The upper end of shaft 110 extends up into the sump chamber 114 above the normal level of oil therein.

The driven coupling element 122 of the hydraulic coupling 102 is drivably connected by a shaft 126 to a gear type scavenge pump 124, similar to the pump 30 of Figures 2-4. A clearance 128 is provided between the coupling elements 100 and 122 and the centrifugal force, acting on the oil within the coupling, forces the oil out from the coupling into an annular space 130 and down through an opening 132 to an inlet chamber 134 for the scavenge pump 124. From the scavenge pump the oil is pumped thereby through the pump outlet 136 and the oil cooler 32 back into the oil reservoir 24. Oil strainers may also be provided in Figures 5 and 6 as in Figures 2 and 4.

The operation of Figures 5 and 6 is quite similar to that of Figures 2 to 4. Thus, in both forms of the invention the hydraulic coupling provides a variable speed drive for the scavenge pump such that the speed of operation of the scavenge pump depends on the amount of oil available in the engine sump whereby the pump gears remain submerged in oil during pump operation. In addition, the hydraulic coupling serves to boost the inlet pressure to the scavenge pump and the hydraulic coupling acts as a centrifuge separating the air or other gases entrained or mixed with the oil in the sump. However, in Figures 2 to 4, the oil enters the coupling from the sump through the hollow coupling drive shaft 48 and the gases separated from the oil escape through the center of this shaft whereas in Figures 5 and 6 the sump oil enters the coupling through separate passages 112 and the separated gases escape through the hollow coupling drive shaft 110.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In an engine, an oil sump, a scavenge pump for removing oil from said sump, and a hydraulic slip coupling having a chamber adapted to be loaded with oil from said sump to provide a drive from said engine to said pump, said coupling chamber being serially disposed in the oil flow path between said sump and pump, the arrangement being such that substantially all the oil reaching the inlet side of said pump passes through said coupling chamber.

2. In an engine, an oil sump, a scavenge pump for removing oil from said sump, and a rotatable hydraulic slip coupling loadable by oil from said sump to provide a drive from said engine to said pump and to boost the inlet pressure to said pump, the arrangement being such that substantially all the oil reaching the inlet side of said pump passes through said coupling chamber.

3. In an engine, an oil sump, a scavenge pump for removing oil from said sump, and a rotatable hydraulic slip coupling having a chamber adapted to be loaded with oil from said sump to provide a drive from said engine to said pump, said coupling having an opening adjacent its outer periphery through which oil is forced from said chamber to the inlet of said pump by the centrifugal force acting on the oil within said chamber, the arrangement being such that substantially all the oil reaching the inlet side of said pump passes through said coupling chamber.

4. In an engine, an oil sump, a scavenge pump for removing oil from said sump, and a rotatable hydraulic slip coupling loadable by oil from said sump to provide a drive from said engine to said pump, said coupling also being effective to remove air or other gases from the oil flowing from said sump to said pump.

5. In an engine, an oil sump, a scavenge pump for removing oil from said sump, and a hydraulic slip coupling comprising first and second coupling elements drivably connected to said engine and pump respectively, said coupling elements defining a coupling chamber therebetween, the drive connection between said first coupling element and engine including a hollow shaft having an open end extending up into said sump, the interior of said hollow shaft being in communication with said annular chamber adjacent the inner diameter of said chamber.

6. In an engine, an oil sump, a scavenge pump for removing oil from said sump, and a hydraulic slip coupling comprising first and second coupling elements drivably connected to said engine and pump respectively, said coupling elements defining therebetween a coupling chamber serially disposed in the oil flow path between said sump and pump, the drive connection between said first coupling element and engine including a hollow shaft having an open end extending up into said sump, the interior of said hollow shaft being in communication with said annular chamber adjacent the inner diameter of said chamber.

7. In an engine, an oil sump, a scavenge pump for removing oil from said sump, a hydraulic slip coupling comprising first and second coupling elements drivably connected to said engine and pump respectively, said coupling elements defining a coupling chamber therebetween, the drive connection between said first coupling element and engine including a hollow shaft having an open end extending into said sump above the normal level of oil therein, the interior of said hollow shaft being in communication with said annular chamber adjacent the inner diameter of said chamber, and passage means independent of said hollow shaft providing for the flow of oil from said sump into said chamber, said passage means and chamber being serially disposed in the oil flow path between said sump and pump.

8. In an engine, an oil sump, a scavenge pump for removing oil from said sump, and a hydraulic slip coupling comprising first and second coupling elements drivably connected to said engine and pump respectively, said coupling elements defining a coupling chamber therebetween, the drive connection between said first coupling element and engine including a hollow shaft providing an oil flow path between said sump and chamber.

9. In an engine, an oil sump, a scavenge pump for removing oil from said sump, and a hydraulic slip coupling comprising first and second coupling elements drivably connected to said engine and pump respectively, said coupling elements defining a coupling chamber therebetween, the drive connection between said first coupling element and engine including a hollow shaft providing an oil flow path between said sump and chamber, said oil flow path and chamber being serially disposed in the oil flow path between said sump and pump.

10. In an engine, an oil sump, a scavenge pump for removing oil from said sump, a hydraulic slip coupling comprising first and second coupling elements drivably connected to said engine and pump respectively, said coupling elements defining a coupling chamber therebetween, the drive connection between said first coupling element and engine including a hollow shaft providing an oil flow path between said sump and chamber, and a plurality of vanes within said hollow shaft for causing rotation of the oil therein with said shaft.

11. In an engine, an oil sump, a scavenge pump for removing oil from said sump, and a hydraulic slip coupling comprising first and second coupling elements drivably connected to said engine and pump respectively, said coupling elements defining a coupling chamber therebetween, the drive connection between said first coupling element and engine including a hollow shaft providing an oil flow path between said sump and chamber, and a plurality of vanes within said hollow shaft for causing rotation of all therein with said shaft, said vanes having a substantially-helical twist about the axis of said shaft.

12. In combination, a chamber for a liquid, a pump for removing said liquid from said chamber, power means, and a hydraulic slip coupling having a space adapted to be loaded with liquid from said chamber to provide a drive from said power means to said pump, said coupling space being serially disposed in the liquid flow path between said chamber and pump, the arrangement being such that substantially all the oil reaching the inlet side of said pump passes through said coupling chamber.

13. In combination, a chamber for a liquid, a pump for removing said liquid from said chamber, power means, and a rotatable hydraulic slip coupling having an annular space adapted to be loaded with liquid from said chamber to provide a drive from said power means to said pump, said coupling annular space being serially disposed in the liquid flow path between said chamber and pump and having an opening adjacent its outer periphery through which liquid is forced from said chamber to the inlet of said pump by the centrifugal force acting on the liquid in said chamber, the arrangement being such that substantially all the oil reaching the inlet side of said pump passes through said coupling chamber.

WILLARD F. MEYERS.

REFERENCES CITED

The following references are of record in the file of this patent:

UNITED STATES PATENTS

| Number | Name | Date |
| --- | --- | --- |
| 2,092,092 | Sinclair et al. | Sept. 7, 1937 |
| 2,160,295 | Stewart | May 30, 1939 |
| 2,340,975 | Morgan | Feb. 8, 1944 |

FOREIGN PATENTS

| Number | Country | Date |
| --- | --- | --- |
| 374,636 | British | 1932 |
| 251,237 | British | 1926 |